United States Patent
Chalons et al.

(10) Patent No.: US 6,652,304 B1
(45) Date of Patent: Nov. 25, 2003

(54) ARRANGEMENT FOR AUTOMATICALLY CONNECTING TWO ELECTRICAL SYSTEMS IN MOTOR VEHICLE

(75) Inventors: Jean Chalons, Garches (FR); Guy Dupuis, Paris (FR)

(73) Assignee: Renault, Boulogne (FR)

( * ) Notice: Subject to any disclaimer, the term of this patent is extended or adjusted under 35 U.S.C. 154(b) by 0 days.

(21) Appl. No.: 09/856,173

(22) PCT Filed: Dec. 3, 1999

(86) PCT No.: PCT/FR99/02999
§ 371 (c)(1),
(2), (4) Date: Aug. 29, 2001

(87) PCT Pub. No.: WO00/35055
PCT Pub. Date: Jun. 15, 2000

(30) Foreign Application Priority Data

Dec. 4, 1998 (FR) .......................................... 98 15370

(51) Int. Cl.[7] .............................................. H01R 13/64
(52) U.S. Cl. .......................................... 439/246; 439/6
(58) Field of Search ................................ 439/246, 247, 439/248, 6, 34

(56) References Cited

U.S. PATENT DOCUMENTS

| | | | |
|---|---|---|---|
| 5,318,455 A | | 6/1994 | Villiers et al. .............. 439/247 |
| 5,554,041 A | * | 9/1996 | Lallement .................... 439/247 |
| 5,556,286 A | * | 9/1996 | Ikesugi et al. .............. 439/247 |
| 5,752,845 A | | 5/1998 | Fu ............................... 439/247 |
| 6,050,835 A | * | 4/2000 | Henrion et al. ............. 439/247 |
| 6,422,886 B1 | * | 7/2002 | Macbeth et al. ............ 439/247 |

FOREIGN PATENT DOCUMENTS

EP 0 753 905 1/1997

* cited by examiner

Primary Examiner—P. Austin Bradley
Assistant Examiner—Briggitte R. Hammond
(74) Attorney, Agent, or Firm—Oblon, Spivak, McClelland, Maier & Neustadt, P.C.

(57) ABSTRACT

An arrangement for connecting an auxiliary electrical system associated with a subassembly to a main electrical system, wherein the subassembly is mounted on a structural element of a vehicle body along a main vertical mounting direction, and including an auxiliary electrical connection element borne by the subassembly and a main element borne by the structural element. The auxiliary element is fixed and borne by the subassembly, and the main element is mounted switching between an inoperative position whereto it is elastically returned and a connecting position whereto it is automatically moved by the subassembly. The arrangement is useful, e.g., for mounting a motor vehicle seat.

10 Claims, 5 Drawing Sheets

ARRANGEMENT FOR AUTOMATICALLY CONNECTING TWO ELECTRICAL SYSTEMS IN MOTOR VEHICLE

The invention relates to an arrangement with which an auxiliary electric circuit associated with a subassembly of a vehicle can be connected automatically to a main circuit of the vehicle.

The invention relates among other aspects to the arrangement for connection of an auxiliary electric circuit associated with a motor vehicle seat, in particular to supply different devices of the seat with electric power and to permit the exchange of data, such as control instructions, between the seat and central control and detection means.

According to current designs of such arrangements, the seat to be connected to the main circuit is provided with a bundle of electrical cables and wires terminated by an auxiliary connector element, which is designed to be coupled with a complementary main connector element itself mounted at the free end of an electrical bundle belonging to the main electric circuit of the vehicle.

The operation of connection by coupling of two complementary connector elements is performed manually in the course of the mounting and assembly. In fact, the seat with its slides for adjusting its longitudinal position in the vehicle is mounted on the vehicle floor, and the two connector elements are then coupled manually by an operator in a coupling direction corresponding substantially to the direction of the two electrical bundles, retention in coupled position of the two connector elements, which are of the male/female type, being achieved in this direction of the bundles and by latching means.

Such a known arrangement and the resulting process of electrical connection by manual coupling suffer from numerous drawbacks.

First of all the operation can be performed only manually, making it necessary to rely on an operator and prolonging the mounting time.

When the operation is performed manually by an operator, it must be accomplished in zones that are difficult to reach, leading to uncomfortable postures for the operator.

Coupling or plugging in the two elements on the connector in a direction corresponding to the axis of the electrical bundles increases the overall space requirement of the known arrangement.

Finally, the presence of connecting bundles with their two complementary connector elements is not very esthetic.

In order to remedy these drawbacks, the invention proposes an arrangement of the type in which the subassembly is mounted on a structural element of the vehicle body, especially a floor, in a principal mounting direction, which in particular is vertical, of the type provided with an auxiliary electrical connector element supported by the subassembly and a complementary main connector element supported by the structural element of the vehicle, which are coupled at the end of the operation of mounting of the subassembly, characterized in that the auxiliary connector element is a fixed element supported by the subassembly and in that the main connector element is mounted movably relative to the structural element between a rest position, toward which it is retracted elastically, and a connection position, toward which it is automatically displaced by the subassembly at the end of the mounting travel of the latter.

According to other characteristics of the invention:

- the main connector element is mounted in tilting relationship relative to the structural element around a horizontal pivot axis, and the auxiliary connector element is provided with a control tongue which cooperates with a facing part of the main connector element to cause the latter to turn from its rest position toward its connection position;
- the control tongue cooperates with an upper face of the body of the main connector element;
- the auxiliary connector element is provided with a vertical rear transverse connection face, and the main connector element is provided with a front transverse connection face, which is parallel to the pivot axis and which, in connection position, is substantially vertical and extends opposite the rear transverse connection face, the bodies of the two connector elements then extending substantially longitudinally, one in the prolongation of the other;
- at least one of the connector elements is provided with connecting elements which project longitudinally beyond its transverse connection face and which are elastically compressible such that each one can cooperate with a corresponding contact element, especially a fixed contact element, disposed in facing relationship in the transverse connection face of the other connector element;
- the main connector element is supported by a substantially horizontal intermediate platen;
- the vertical position of the platen relative to the structural element is automatically adjustable during the mounting of the subassembly on the structural element;
- the intermediate platen is urged elastically toward a maximum upper adjustment position;
- the upper face of the intermediate platen is provided with means for automatic, centering of the body of the auxiliary connector element in the transverse direction, the said means cooperating with the lower portion thereof during mounting of the subassembly;
- the longitudinal position of the intermediate platen relative to the structural element is automatically adjustable during mounting of the subassembly;
- the body of the auxiliary connector element is fixed under a slide for guiding the longitudinal translational movement of a motor vehicle seat.

Other characteristics and advantages of the invention will become apparent upon reading of the detailed description which follows and which will be understood by referring to the attached drawings, wherein.

In the description to follow, the terms "horizontal", "vertical", "lower", "upper", etc. will be used in non-limitative manner with reference to the figures in order to simplify the description and the claims.

Figure 1:
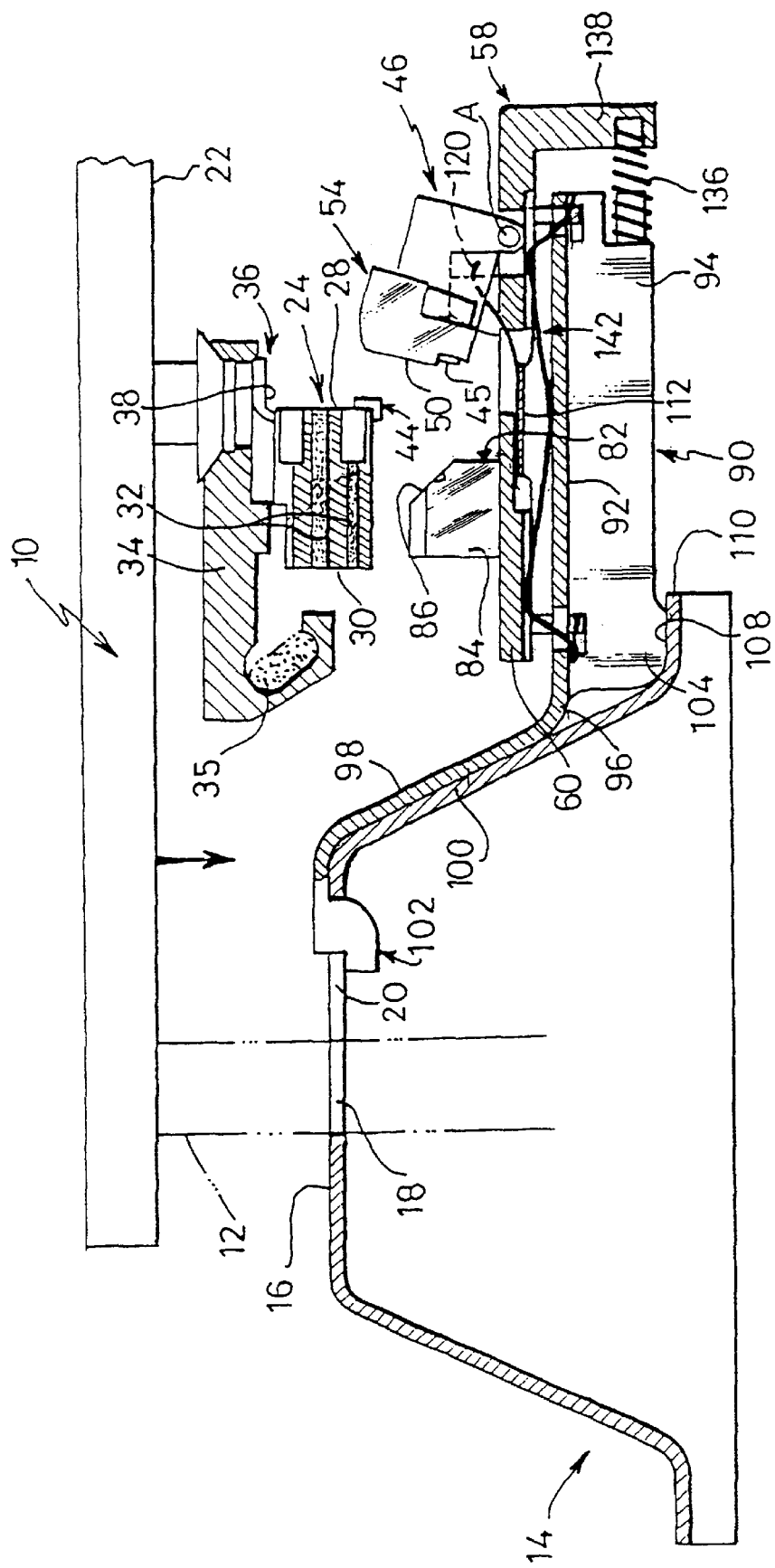
FIG. 1 is a simplified schematic view of an arrangement according to the teachings of the invention for electrical connection of a vehicle seat to the main electric circuit of the vehicle, the main components of the arrangement according to the invention being illustrated during a first stage of approach movement of the seat during assembly and mounting operations.
Figure 2:
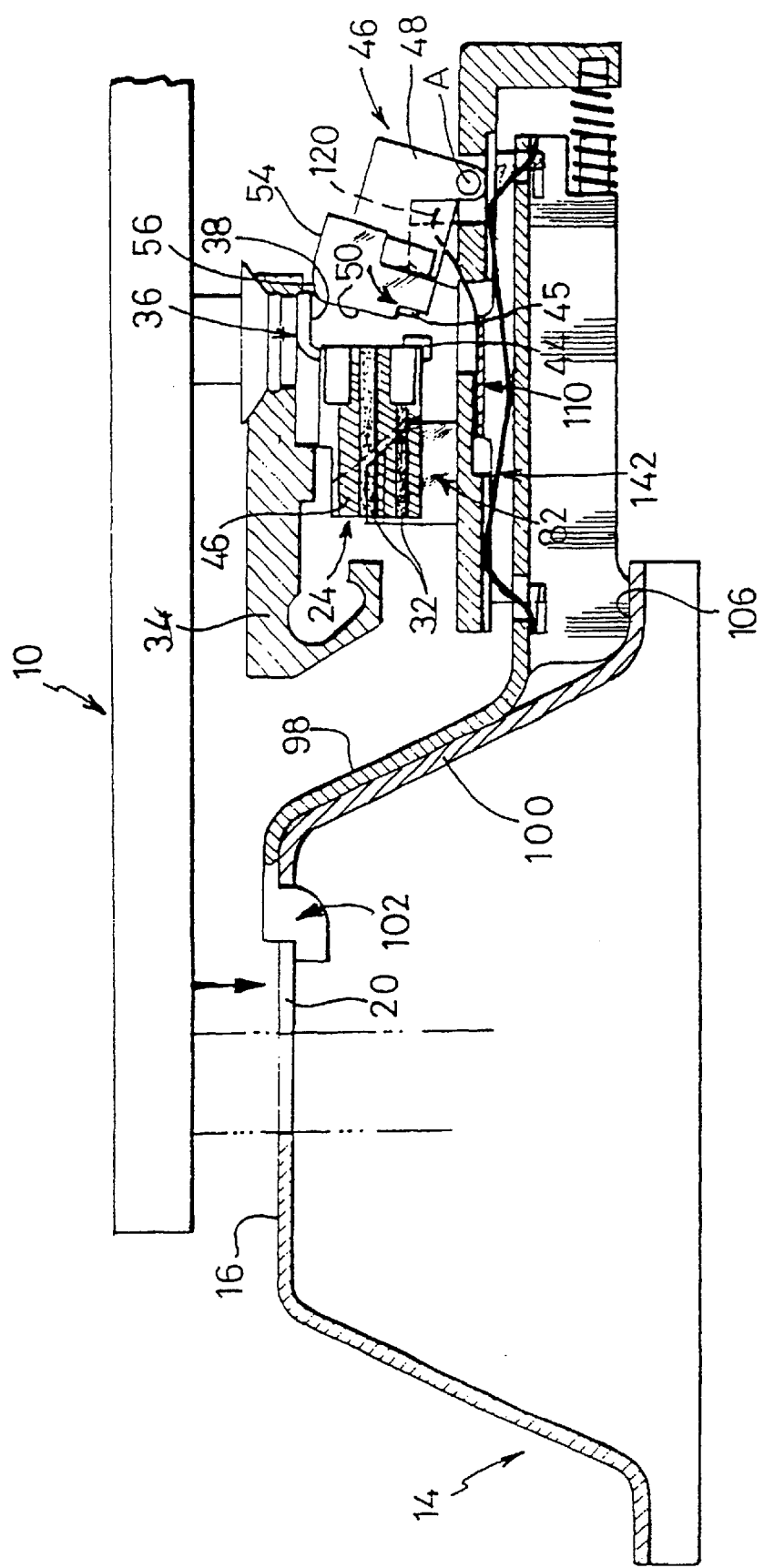
FIG. 2 is a view similar to that of FIG. 1, in which the components are illustrated in a position corresponding to docking of the tilting main connector element with the auxiliary connector element supported by the seat.
Figure 3:
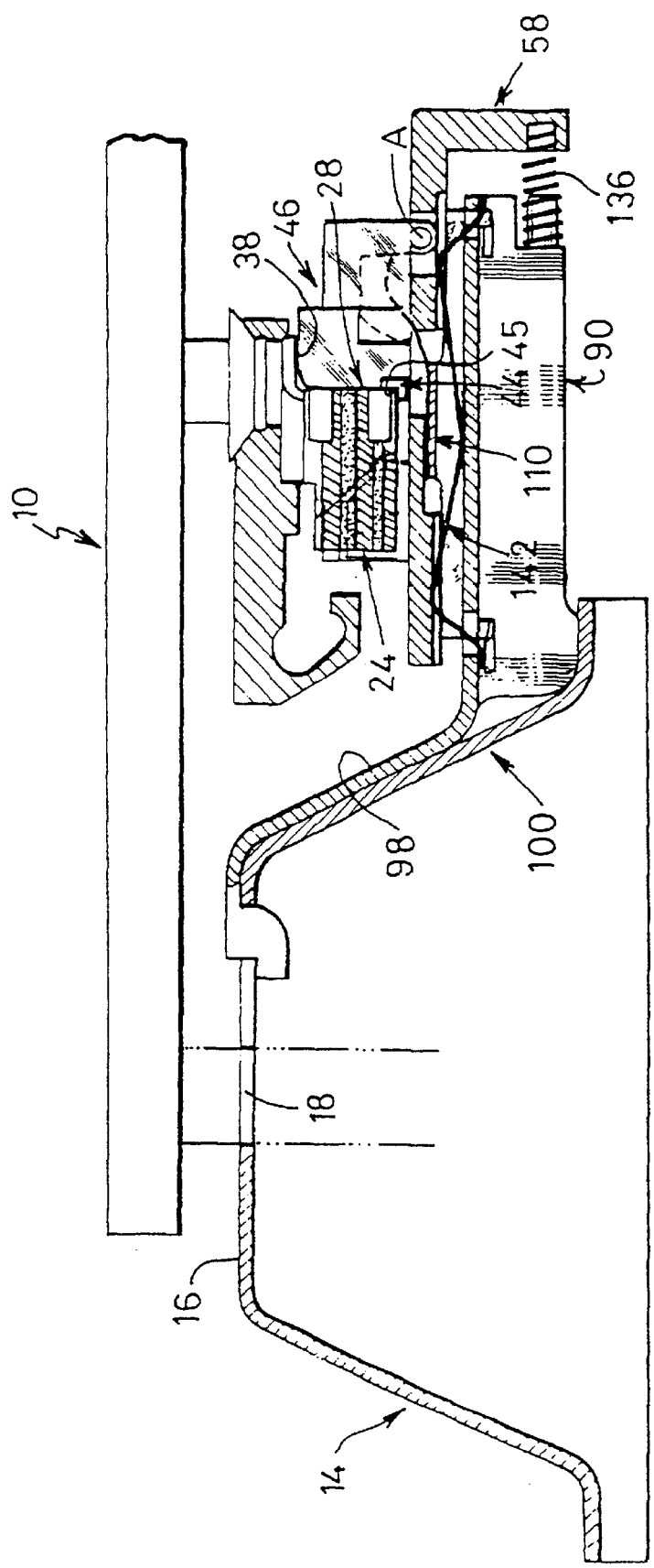
FIG. 3 is a view similar to those of FIGS. 1 and 2, in which the seat is illustrated in mounted position with the two complementary connector elements illustrated in coupled position.
Figure 4:
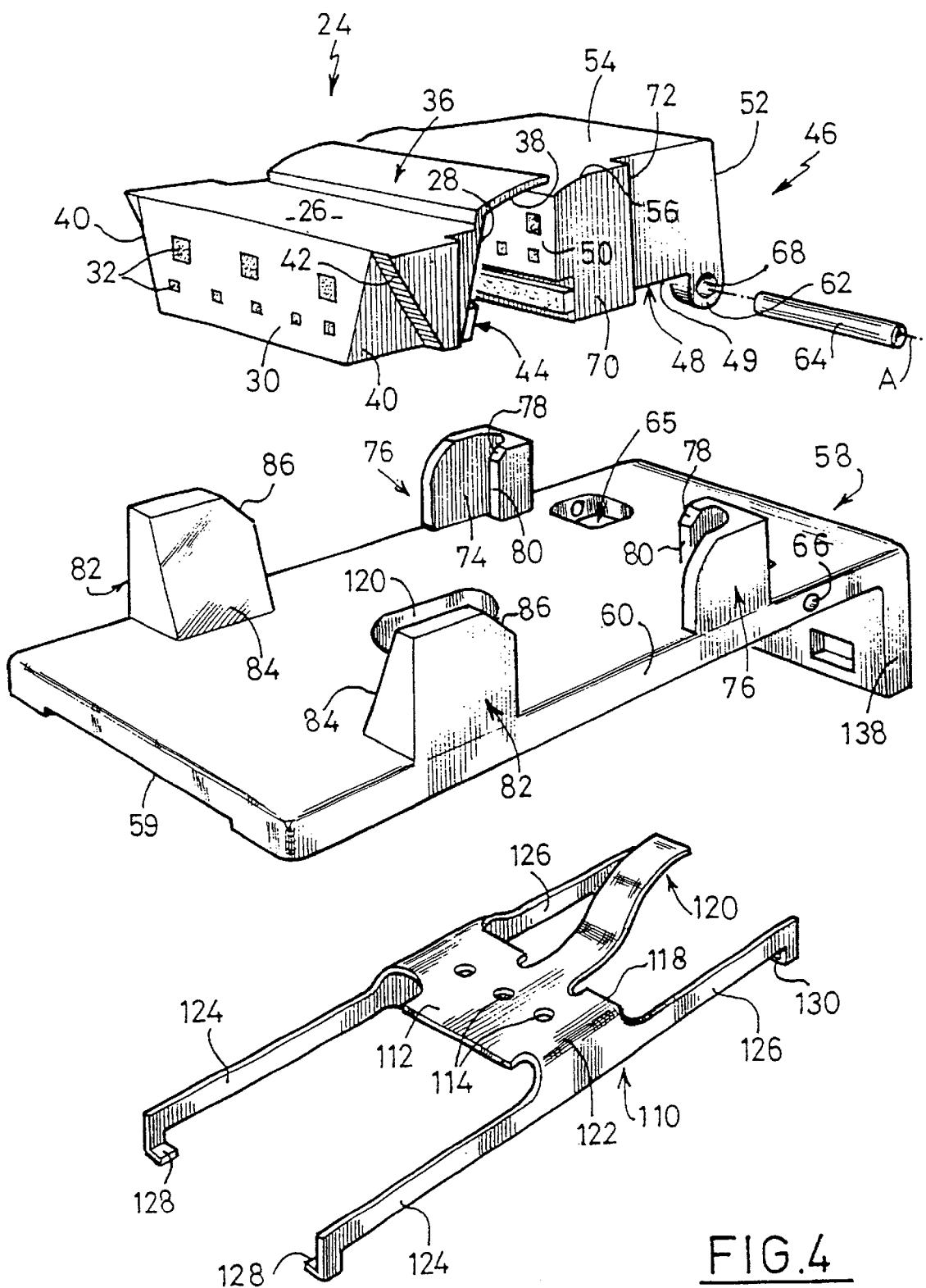
FIG. 4 is a three-quarters exploded perspective schematic view from the front of some of the components of the arrangement according to the invention.
Figure 5:
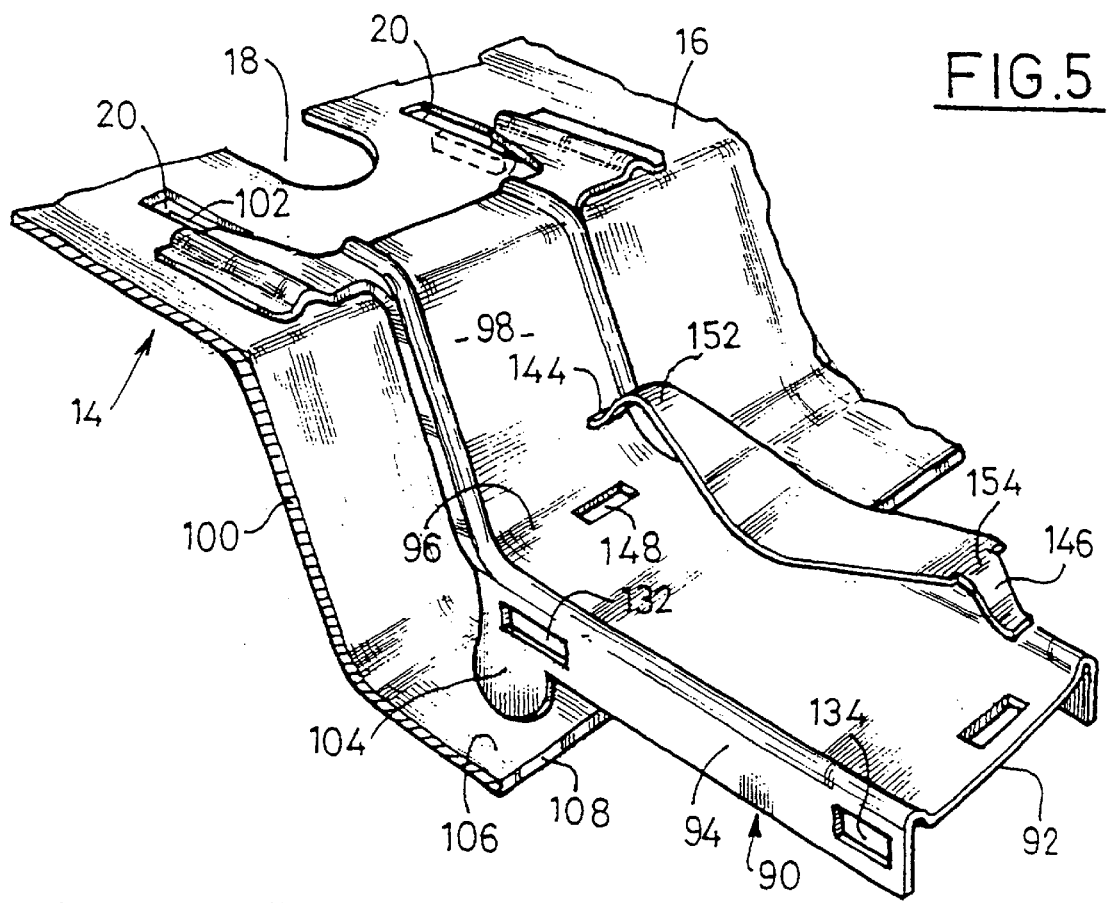
FIG. 5 is a three-quarters exploded perspective schematic view from the rear of other components of the arrangement.

FIGS. 1 to 3 show a longitudinal slide 10 which adjustably supports a vehicle seat (not shown) on its upper part.

The seat is equipped in general with two lower slides 10 which, at the end of the operations of assembly of the seat on the vehicle, are fixed, by threaded rods 12 for example, on an element 14 of the vehicle floor, which is shown here in the form of a sheet-metal crosspiece which has substantially the shape of an inverted U with a horizontal upper face in the form of a plate 16 provided with a hole 18, for example, for passage of threaded rod 12, and with two longitudinally oriented parallel slots 20, the function of which will be explained hereinafter.

According to the teachings of the invention, a slide 10 supports under its lower face 22 an auxiliary connector element 24, the body 26 of which is, for example, a molded piece of insulating material which is bounded by a front transverse connecting face 28 and by a front face 30, which is transverse, parallel and vertical, for electrical connection.

Electrical connecting elements 32, illustrated schematically in the figures, open into front transverse connection face 30 where they can be connected by crimping or soldering to electrical wires and cables belonging to a bundle 35 which groups the wires and cables of the auxiliary electric circuit of the seat, while bundle 32 is guided and positioned relative to slide 10 and to auxiliary connector element 24 by a guide piece 34 which, in particular, allows the bundle to be oriented globally underneath slide 10 as far as auxiliary connector element 24.

Body 26 of insulating material is fixed by its upper part underneath slide 22, and it is provided with a control tongue 36 which extends longitudinally from front to rear beyond front transverse connecting face 28, and whose plane lower face 38, which is horizontally oriented here, constitutes the face for control of displacements by tilting the complementary main connector element, to be described hereinafter.

Body 26 is also bounded transversely by two opposite side faces 40, each of which is provided with inclined guide ramps 42.

At its rear lower end, on the right in FIGS. 1 to 3, auxiliary connector element 24 is also provided with at least one positioning and locking tongue or tab 44.

Auxiliary connector element 24 is complementary to a main connector element 46, which itself comprises substantially a body 48 of insulating material of general rectangular parallelepiped shape, bounded longitudinally by a front transverse connecting face 50 and by a rear transverse face 52 for connection to a bundle (not shown in the figures) belonging to the main electric circuit of the vehicle.

At its top, body 48 of insulating material is bounded vertically by a substantially horizontal upper control face 54, whose front longitudinal end part 56 is curved, with its convexity oriented vertically upward to cooperate with lower face 38 of control tongue 36.

Body 48 of main connector element 46 is globally mounted in tilting relationship around a horizontal axis A, disposed in the vicinity of its rear lower end, on an intermediate mounting platen 58.

Platen 58 has substantially the form of a horizontal plate 60, which in the vicinity of its rear longitudinal end is provided with three transversely aligned holes 65, each of which accommodates a pivot tongue 62 of main connector element 46, the pivot being completed by two pivot pins 64, each of which passes through transversely aligned holes 66 and 68 formed respectively in plate 60 and tongues 62.

Insulating body 48 is bounded transversely by two parallel and opposite longitudinal faces 70, which are bounded at the rear by two transverse vertical faces 72 and which are designed to be accommodated laterally between opposite internal faces 74 belonging to two rear tongues 76 for guiding main connector element 46, these tongues extending vertically above plate 60 of intermediate platen 58.

Each tongue 76 is also provided with upper chamfers 78 and vertical transverse guide faces 80, which are designed to cooperate with faces 72 of main connector element 46.

Upper face 61 of horizontal plate 60 of intermediate platen 58 is provided with two other front tongues 82 for guiding auxiliary connector element 24, these tongues being disposed longitudinally close to its front end, each being provided with an internal face 84 with two facets inclined inwardly from top to bottom to constitute transverse centering ramps for auxiliary connector element 24, which ramps cooperate with its side faces 40 and which are provided with upper chamfers 86 designed to cooperate with ramps 42 such that auxiliary connector element 24 is displaced longitudinally from front to rear when it is introduced vertically from top to bottom between guide tongues 82.

The mutual longitudinal approach of the two auxiliary and main connector elements 24 and 46 has as its purpose bringing their transverse connecting faces 28 and 50 together in order to bring into contact connecting elements 32 supported by auxiliary connector element 24 and connecting elements 51 supported by main connector element 46, these connecting elements 32, 51 preferably projecting axially toward the rear and toward the front respectively, in order to come into mutual contact at the end of the operation of coupling of the two connector elements.

Preferably, according to a characteristic of detail that is not shown, at least one series of connecting elements 32 and/or 51 is axially compressible under the effect of an elastic restoring force which urges them in the connection direction, specifically in order to guarantee good mutual electrical contact between the connecting elements and therefore good quality of the electrical connection.

Intermediate platen 58 is mounted on crosspiece 14 with interposition of a folded sheet-metal support 90, which is cut in the shape of an inverted U.

Support 90 substantially comprises an upper horizontal plate 92, which is prolonged by two vertical side wings 94 of longitudinal orientation and, beyond its front longitudinal edge 96, by an inclined upper bracing plate 98, which extends opposite rear inclined transverse face 100 of crosspiece 14, plate 98 being terminated by two front attachment tongues 102, each of which is accommodated in longitudinal sliding relationship in a slot 20, the conformation of tongues 102 being such that they retain support 90 vertically in both upward and downward directions relative to crosspiece 14.

The vertical bracing of support 90 on crosspiece 14 in order to maintain upper plate 92 in a substantially horizontal plane is completed by two front feet 104, each of which belongs to a wing 94 and is braced vertically on upper face 106 of a rear horizontal longitudinal wing 108 of crosspiece 14.

Taking into account the manufacturing tolerances of the different pieces, a slight longitudinal play is provided at the level of attachment tongues 102 and slots 20 to create the capability of adjustment of metal support 90 in longitudinal position relative to fixed crosspiece 14.

A metal piece 110 is interposed vertically between the lower face of horizontal plate 60 of intermediate platen 58 and the upper face of horizontal plate 92 of support 90.

The function of piece 110 is to retain intermediate plate 58 vertically relative to support 90 with an ability to adjust the vertical position of the platen relative to the support and to continuously urge main connector element 46, mounted in tilting relationship on platen 58, elastically in clockwise direction as viewed in FIG. 1.

To this end, intermediate piece 110 forming a tilting spring is provided with an upper horizontal plate 112, which is designed to be fixed, for example by hot crimping of dog points (not shown) extending vertically under plastic plate 60 of intermediate platen 58 into corresponding holes 114 of plate 112.

Thus plate 112 is made integral with intermediate platen 58.

Starting from plate 112, piece 110 is provided with a strip 120 forming a spring which extends from a rear transverse edge 118 toward the rear and vertically upward relative to the plane of plate 112 through an aperture in the form of longitudinal opening 121 of plate 60 of intermediate platen 58 such that it cooperates with a facing portion of lower face 49 of insulating body 48 of main connector element 46, thus urging the latter to tilt around axis A in the clockwise direction as seen in FIG. 1.

Starting from its parallel longitudinal edges 122, plate 112 is provided with two vertical side wings 123 which extend downward and each of which is prolonged by two opposite longitudinal branches 124 and 126, front and rear respectively, each of which is terminated by a retaining tongue 128, 130 extending transversely inward in a horizontal plane.

Figure 6:
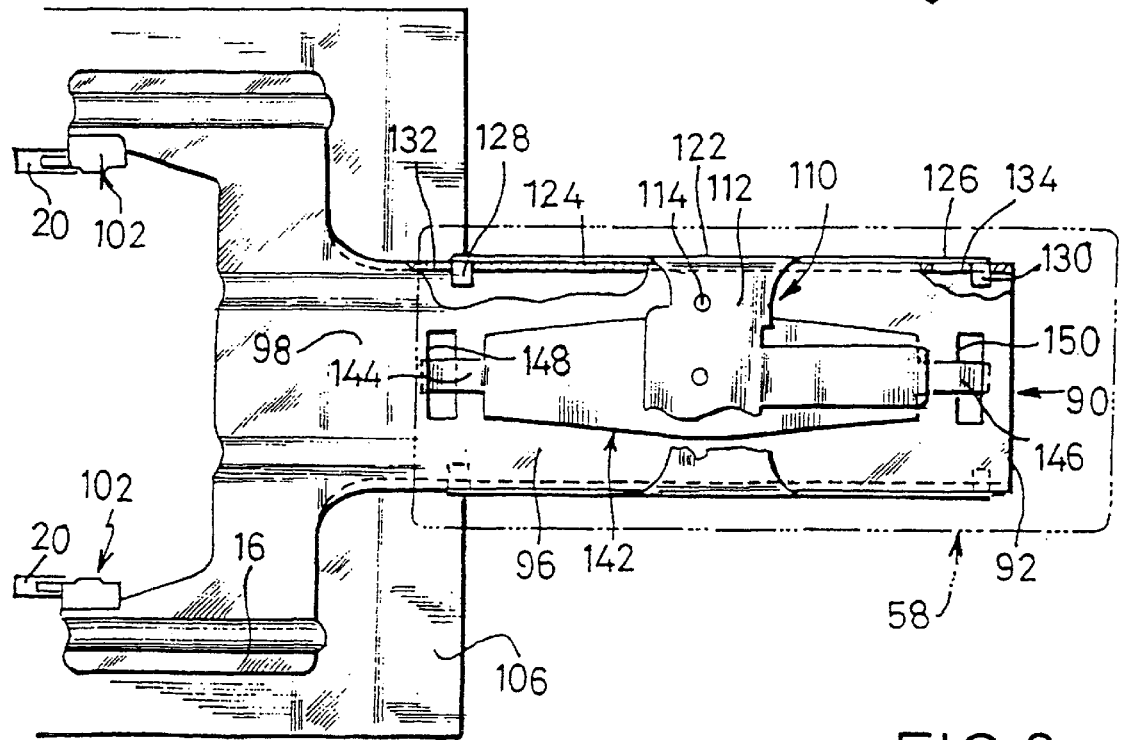
FIG. 6 is a view from above of some of the components of the arrangement according to the invention.

The transverse spacing of wings 123 is such that intermediate piece 110 vertically straddles horizontal plate 92 of support 90, as can be seen in particular in FIG. 6.

In their free rest state, longitudinal branches 124 and 126 are pinched transversely inward and, during assembly of piece 110 on support 90, they are slightly spread apart transversely in a manner that guarantees that tongues 128 and 130 each penetrate into complementary slots 132, 134, which are longitudinally oriented horizontal slots formed in vertical side wings 94 of support 90.

The height and length of slots 132 and 134 are such that in this way they permit adjustment of the position of intermediate platen 58 relative to support 90, platen 58 being urged elastically relative to support 90 by springs 136 (see FIG. 1), which are interposed between wings 94 and a facing portion of a rear vertical end plate 138 of intermediate platen 58.

Platen 58 is continuously urged elastically upward relative to support 90 into an upper adjustment position by at least one intermediate spring 142, which in this case is a longitudinally oriented leaf spring shaped as a V, whose front and rear longitudinal ends 144 and 146 respectively are each accommodated in notches 148, 150 formed at the opposite longitudinal ends of horizontal plate 92 of support 90.

Curved upper ends 152 and 154 of intermediate spring 142 cooperate continuously with a facing portion of lower face 59 of plate 60 of intermediate platen 58, spring 142 being continuously compressed vertically such that it urges platen 58 vertically upward together with attachment tongues 128 and 130, which ensure that platen 58 is retained vertically upward relative to support 90.

Referring in particular to FIGS. 1 to 3, the functioning of the arrangement according to the invention during mounting of the seat will now be described.

Starting from the position illustrated in FIG. 1, the seat with its slides 10 and fixed auxiliary connector element 24 descends vertically relative to crosspiece 14 and therefore relative to intermediate platen 58; which supports main tilting connector element 46, which is in its upper position illustrated in FIG. 1, where its front transverse connecting face 50 is not vertical but is slightly inclined, forming an upwardly open angle.

The descending movement of the seat with its slides 10 relative to crosspiece 14 is continued as far as the docking position of connector elements 24 and 86 illustrated in FIG. 2.

During this descending movement, body 26 of auxiliary connector element 24 is transversely centered by tongues 82, and the cooperation of chamfers 46 with ramps 42 causes a relative longitudinal displacement thereof from front to rear relative to platen 58.

Lower face 38 of control tongue 36 also becomes docked with curved convex part 56 of upper face 54 of main tilting connector element 46, thus causing its body 48 to tilt progressively in counterclockwise direction around axis A as seen in FIGS. 1 to 3.

The descending movement is continued until the connection position illustrated in FIG. 3 is reached, where the two connector elements 24 and 46 are coupled, or in other words the connecting elements that it supports and that are projecting into their rear and front transverse connecting faces 28 and 50 respectively are in electrical contact.

The tilting movement of connector 46 is terminated and transverse faces 28 and 50 both have vertical orientation.

At the end of the tilting movement to reach the position illustrated in FIG. 3, tabs 44 are accommodated in complementary notches 45 formed at the front lower longitudinal end of body 48 of main connector element 46.

The different abilities for adjustment of intermediate platen 58 in vertical and longitudinal position relative to support 90 make it possible to guarantee good electrical connection regardless of the manufacturing and mounting dispersions and tolerances of the different components of the arrangement according to the invention.

In this way, intermediate spring 142 can be slightly compressed while platen 58 can be displaced longitudinally relative to support 90.

Thus electrical connection is achieved automatically, which in particular permits the operations of mounting of the seat to be performed by robotic techniques.

At the end of the first docking phase, the two bodies of connector elements 24 and 46 are aligned longitudinally. Their final coupling position, illustrated in FIG. 3 being such that each globally extends longitudinally in the prolongation of the other, thus globally reducing the vertical space requirement of the electrical connection means.

The invention is not limited to the application comprising the arrangement of electrical connection to a vehicle seat, but it can be applied to any other subassembly scheduled to be assembled automatically, while guaranteeing good precision of electrical connection despite manufacturing tolerances and dispersions.

In the case of a seat, it is also possible to provide a plurality of electrical connection arrangements for the same seat as a function of the number of electrical devices with which it is equipped.

What is claimed is:

1. An arrangement for connecting an auxiliary electric circuit associated with a subassembly to a main electric circuit of the vehicle, to supply devices belonging to the subassembly, wherein the subassembly is mounted on a structural element of the vehicle body in a vertical mounting direction, the arrangement including an auxiliary electrical connector element supported by the subassembly and a complementary main connector element supported by the structural element of the vehicle, the auxiliary electrical connector element and the main connector element being coupled at the end of the operation of mounting of the subassembly, wherein the auxiliary electrical connector element is a fixed element supported by the subassembly and the main connector element is mounted movably relative to the structural element between a rest position, toward which it is retracted elastically, and a connection position, toward which it is automatically displaced by the subassembly at a time when mounting travel of the subassembly has ceased, wherein the main connector element is mounted in tilting relationship relative to the structural element around a horizontal pivot axis, and wherein the auxiliary electrical connector element comprises a control tongue which cooperates with a facing part of the main connector element to cause the main connector element to turn from the rest position toward the connection position.

2. An arrangement according to claim 1, characterized in that the control tongue cooperates with an upper face of the body of the main connector element.

3. An arrangement according to claim 1, characterized in that the auxiliary connector element is provided with a vertical rear transverse connection face, and in that the main connector element is provided with a front transverse connection face, which is parallel to the pivot axis and which, in connection position, is substantially vertical and extends opposite the front transverse connection face, the bodies of the two connector elements then extending substantially longitudinally one in the prolongation of the other.

4. An arrangement according to claim 3, characterized in that at least one of the connector elements is provided with the connecting elements which project longitudinally beyond its transverse connection face and which are elastically compressible such that each one can cooperate with a corresponding contact element, especially a fixed contact element, disposed in facing relationship in the transverse connection face of the other connector element.

5. An arrangement according to claim 1, characterized in that the main connector element is supported by a substantially horizontal intermediate platen.

6. An arrangement according to claim 5, characterized in that the upper face of the intermediate platen is provided with means for automatic centering of the body of the auxiliary connector element in the transverse direction, the said means cooperating with the lower portion thereof during mounting of the subassembly.

7. An arrangement according to claim 5, characterized in that the longitudinal position of the intermediate platen relative to the structural element is automatically adjustable during mounting of the subassembly.

8. An arrangement according to claim 5, characterized in that the horizontal position of the platen relative to the structural element is automatically adjustable during the mounting of the subassembly on the structural element.

9. An arrangement according to claim 8, characterized in that the intermediate platen is urged elastically toward a maximum upper adjustment position.

10. An arrangement according to claim 9, characterized in that the body of the auxiliary connector element is fixed under a slide for guiding the longitudinal translational movement of a motor vehicle seat.

* * * * *

UNITED STATES PATENT AND TRADEMARK OFFICE
CERTIFICATE OF CORRECTION

PATENT NO. : 6,652,304 B1  
DATED : November 25, 2003  
INVENTOR(S) : Chalons et al.

It is certified that error appears in the above-identified patent and that said Letters Patent is hereby corrected as shown below:

<u>Title page,</u>
Item [73], Assignee, should read:
-- [73]   Assignee:  Renault, Boulogne Billancourt (FR) --

Signed and Sealed this

Seventeenth Day of February, 2004

JON W. DUDAS
*Acting Director of the United States Patent and Trademark Office*